Patented Feb. 27, 1934

1,949,129

UNITED STATES PATENT OFFICE 1,949,129

PROCESS FOR THE CONVERSION OF THE GYPSUM CONTAINED IN SUPERPHOSPHATE INTO AMMONIUM SULPHATE

Hermann Oehme, Cologne-Kalk, Germany, assignor to Chemische Fabrik Kalk, Gesellschaft mit beschränkter Haftung, Cologne-Kalk, Germany No Drawing. Application January 27, 1930, Serial No. 423,907. In Germany February 7, 1929

6 Claims. (Cl. 71—9)

Gerlach and other chemists have pointed out the great commercial importance of saving the costs of sulphuric acid which is consumed by the well known decomposition of rock phosphate by allowing ammonia to act on the superphosphate.

Superphosphate, as is well known, is an intimate mixture of calcium monophosphate with free phosphoric acid and gypsum. The proportion of the constituents depends upon the crude phosphate rock used. If rich phosphates are employed the relation of $P_2O_5$ to $CaSO_4$ is 1:2 up to 1:2,5, whereas with poor phosphates having a high percentage of calcium carbonate and fluorides the relation of $P_2O_5$ to $CaSO_4$ is about 1:3 up to 1:3,5.

In the Gerlach process mentioned above gaseous ammonia is allowed to act on superphosphate, whereby with liberation of heat the neutralization of the uncombined phosphoric acid and the conversion of calcium monophosphate into calcium diphosphate take place according to the following equations:

(1) $H_3PO_4 + 2NH_3 = (NH_4)_2HPO_4$
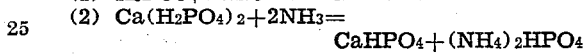
(2) $Ca(H_2PO_4)_2 + 2NH_3 = CaHPO_4 + (NH_4)_2HPO_4$ Sometimes the ammonium phosphate thus formed will react, especially when water is present, with gypsum producing ammonium sulphate and calcium diphosphate ($CaHPO_4$). The gypsum as such i. e. by itself is not converted by gaseous ammonia. Consequently, in the Gerlach process the phosphoric acid is combined to a great extent with ammonia, whereas the quantity of ammonia taken up in proportion with the sulphuric acid used for the decomposition of the phosphate rock is variable and differs from 50 to 70%.

Now, since when using poor phosphate rock for making superphosphate great quantities of sulphuric acid are wasted for decomposing calcium carbonate and calcium fluoride always present in the rock, it appeared very important to find a process which allowed utilizing the gypsum (calcium sulphate) in the superphosphate for fixing the ammonia.

If it is desired to utilize the sulphuric acid in the gypsum, it is well known to decompose phosphate rock with sulphuric acid, whereby phosphoric acid or calcium monophosphate is formed in solution, if sufficient water is present. That solution can be filtered from the insoluble gypsum, whereupon the filtrate is neutralized with ammonia, the gypsum being decomposed with ammonium carbonate. Such a process is very expensive owing to the costs of filtration, washing and concentrating the phosphatic liquors, when the soluble phosphate is wanted in a solid state.

I have now found a method to decompose the gypsum contained in the superphosphate without the need of having recourse to filtration, washing and concentration, by treating the superphosphate primarily neutralized with ammonia, with ammonium carbonate or ammonium bicarbonate and very little water. It is known, that the decomposition of gypsum with ammonium carbonate is accelerated by the presence of plenty of water, but I have discovered that the quantity of water need not be great. I therefore take only a small quantity of water, preferably so small that after the conversion of the gypsum into ammonium sulphate I obtain an artificial manure which can be directly strewn on the fields. The present process is therefore based on the utilization of my discovery that the decomposition of gypsum into ammonium sulphate by the action of ammonium carbonate proceeds quantitatively in the presence of even very small quantities of water.

For instance, I may mix 4 kg. ammonium superphosphate containing 6,7% ammonia and 34,8% sulphuric acid (so that the quantity of ammonia combined is equivalent to 55% of the total sulphuric acid) with 650 g. of ammonium carbonate and 500 g. of water in a pug-mill or a similar mixing apparatus. After two hours mixing the greatest portion of sulphuric acid not combined with ammonia is transformed into ammonium sulphate and calcium carbonate. After blowing off the ammonium carbonate in excess a dry manure is obtained without any separate heating, the ammonia of which is equivalent to 90% of the total sulphuric acid. The phosphoric acid of the product is to a great extent soluble in ammonium citrate (Petermann's solution).

I can also carry out my process by condensing in the superphosphate previously neutralized gaseous ammonia, carbon dioxide and steam in suitable quantities and mixing all together in a mechanical mixing apparatus. After blowing off the ammonium carbonate and possibly some water in excess, I obtain a product which is perfectly dry and in which the ammonia combined is equivalent to more than 90% of the total quantity of sulphuric acid, and in which the phosphoric acid is soluble in ammonium citrate solution to about 90%.

The process may also be carried out by introducing gaseous ammonia, carbon dioxide and steam in suitable quantities into the superphosphate neutralized with ammonia, whereby ammonia and steam are condensed in the superphosphate. The whole mass is then intimately mixed by means of suitable mixing devices.

I have also found that when using in the first phase of my process which is the neutralization of superphosphate with gaseous ammonia instead of a strong ammoniacal gas an ammonia greatly diluted with indifferent gases, air for instance, the phosphoric acid in the finished product obtained at the end of my process will be nearly completely soluble in ammonium citrate.

If required the neutralization of the superphosphate with ammonia can also take place in the presence of dissolved or gaseous ammonium carbonate or bicarbonate and of small quantities of water so that the neutralization of the superphosphate and the subsequent conversion of the gypsum by means of ammonium carbonate can be effected in one single phase. Of course, I can also increase the quantity of water used but the technical realization of the process would become more difficult and the process itself would be charged with expenses for the concentration to get rid of the water which will otherwise be saved.

As previously mentioned, the quantity of water required need only be small and it should always be so regulated that the finished product is in a dry state and can readily be sprinkled on the fields. The transformation of the gypsum with ammonium carbonate proceeds more rapidly at a temperature of 35° to 55° C. I may also use for the conversion an increased pressure in order to accelerate the progress of the reaction. The finished product may also be mixed with other ammonium salts or with potassium salts.

What I claim is:

1. A process for making dry fertilizer from superphosphate which contains gypsum and for converting said gypsum into ammonium sulphate, which comprises neutralizing the superphosphate with ammonia, mixing the neutralized product thoroughly with ammonium carbonate, and only a little water, thus converting the gypsum into ammonium sulphate, and then removing the ammonium carbonate by blowing off, the quantity of water used being so small that the product thus obtained is in a dry comminuted state and is directly ready for use for strewing on the fields without preliminary drying or pulverization.

2. A process for making dry fertilizer from superphosphate which contains gypsum and for converting said gypsum into ammonium sulphate, which comprises neutralizing the superphosphate with ammonia, mixing the neutralized product thoroughly with ammonium bicarbonate, and only a little water, thus converting the gypsum into ammonium sulphate, and then removing the ammonium bicarbonate by blowing off, the quantity of water used being so small that the product thus obtained is in a dry comminuted state and is directly ready for use for strewing on the fields without preliminary drying or pulverization.

3. A process for making dry fertilizer from superphosphate which contains gypsum and for converting said gypsum into ammonium sulphate, which comprises neutralizing the superphosphate with ammonia, mixing the neutralized product thoroughly with ammonia, carbon dioxide and a small amount of steam, all in the gaseous state, reducing the temperature sufficiently to cause ammonium carbonate and water to be condensed in the ammoniated superphosphate in a state of very fine division, thus converting the gypsum into ammonium sulphate, and then removing the ammonium carbonate by blowing off, the quantity of water used being so small that the product thus obtained is in a dry comminuted state and is directly ready for use for strewing on the fields without preliminary drying or pulverization.

4. A process for making dry fertilizer from superphosphate which contains gypsum and for converting said gypsum into ammonium sulphate, which comprises neutralizing the superphosphate with ammonia, in the presence of carbon dioxide and a small quantity of steam, thus converting the gypsum into ammonium sulphate, and then removing the ammonium carbonate by blowing off, the quantity of water used being so small that the product thus obtained is in a dry comminuted state and is directly ready for use for strewing on the fields without preliminary drying or pulverization.

5. A process for making dry fertilizer from superphosphate which contains gypsum, and for converting said gypsum into ammonium sulphate, which comprises neutralizing the superphosphate with gaseous ammonia diluted materially with indifferent gases, mixing the neutralized product thoroughly with ammonium carbonate and only a little water, thus converting the gypsum into ammonium sulphate, and then removing the ammonium carbonate by blowing off, the quantity of water used being so small that the finished product thus obtained is in a dry state and the phosphoric acid contained therein is in a form which is nearly completely soluble in a solution of ammonium citrate.

6. A process for making a dry fertilizer, comprising mixing a neutralized super-phosphate containing residual gypsum with ammonium carbonate and a minimum amount of water, and subjecting the mixture to blowing off to remove adhering unreacted ammonium carbonate from the resulting dry pulverulent fertilizer, the water content being of such a minimum amount that immediately after driving off the excess ammonium carbonate a strewable product is obtained.

HERMANN OEHME.